United States Patent
Matsuura (10) Patent No.: US 7,418,122 B2
(45) Date of Patent: Aug. 26, 2008

(54) IMAGE PROCESSING APPARATUS AND METHOD

(75) Inventor: Tomohiko Matsuura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 11/078,369

(22) Filed: Mar. 14, 2005

(65) Prior Publication Data

US 2005/0207632 A1    Sep. 22, 2005

(30) Foreign Application Priority Data

Mar. 17, 2004    (JP) .............................. 2004-077042

(51) Int. Cl.
*G06K 9/00* (2006.01)

(52) U.S. Cl. .................................... 382/128

(58) Field of Classification Search ................. 382/128, 382/132
See application file for complete search history.

(56) References Cited

U.S. PATENT DOCUMENTS 5,452,367 A * 9/1995 Bick et al. ................... 382/128

FOREIGN PATENT DOCUMENTS

WO    WO 95/14966    6/1995

OTHER PUBLICATIONS

Y. Taniguchi, et al., "Image Processing Engineering—Introduction", Kyoritsu Publishing K.K., Chapter 5, pp. 79-97, Segmenting of Images (1996), together with partial English Translation.

E. Pietka, "Image Standardization in PACS", Handbook of Medical Imaging Processing and Analysis, pp. 783-801 (2000).

J. Rogowska, "Overview and Fundamentals of Medical Image Segmentation", Handbook of Medical Imaging Processing and Analysis, pp. 69-85 (2000).

X. Jing, et al., "Gradation Processing Algorithm of Digital Radiological Chest Image", Journal of Digital Imaging, vol. 14, No. 2, pp. 205-207 (May 3, 2001).

M. Sato, et al., "A Gradient Magnitude Based Region Growing Algorithm for Accurate Segmentation", Image Processing, Proceedings International Conference, vol. 3, pp. 448-451 (Sep. 10, 2000).

* cited by examiner

*Primary Examiner*—Tom Y Lu
(74) *Attorney, Agent, or Firm*—Fitzpatrick, Cella, Harper & Scinto (57) ABSTRACT

An image processing apparatus acquires a first region image by eliminating a non-X-ray irradiated region and a direct irradiated region from an X-ray image, and decides an initial region in the first region image by analyzing the first region image. The initial region is enlarged by using a region growing processing to obtain a second region in the first region image.

10 Claims, 13 Drawing Sheets

| BODY PART | INITIAL REGION |
|---|---|
| CHEST | ADOPT VALUES GREATER THAN PIXEL VALUE OF MAXIMUM FREQUENCY AS INITIAL REGION |
| HEAD | ADOPT 60% OF MAXIMUM-VALUE SIDE OF HISTOGRAM WIDTH (MAXIMUM VALUE − MINIMUM VALUE) AS INITIAL AREA |
| EXTREMITIES | ADOPT VALUES GREATER THAN INTERMEDIATE VALUE BETWEEN PIXEL VALUE OF MAXIMUM FREQUENCY AND MAXIMUM PIXEL VALUE AS INITIAL REGION |
| ⋮ | ⋮ |

IMAGE PROCESSING APPARATUS AND METHOD

FIELD OF THE INVENTION

This invention relates to an image processing technique for acquiring a subject region from an X-ray image more precisely and accurately.

BACKGROUND OF THE INVENTION

Owing to progress in the digital processing of image information in recent years, it is now common to apply digital processing even to medical X-ray images. In particular, sensors that are capable of outputting X-ray image data in digital form have been developed to take the place of X-ray photography using conventional film. The digital processing of medical X-ray images is essential in an X-ray imaging apparatus that uses such a sensor. There are various types of digital processing that can be applied to images captured by a sensor or camera. One important example of such image processing is gray level transformation processing, which converts acquired data to an image having easier-to-observe density values by applying a gray level transformation to the captured data.

Figure 11A:
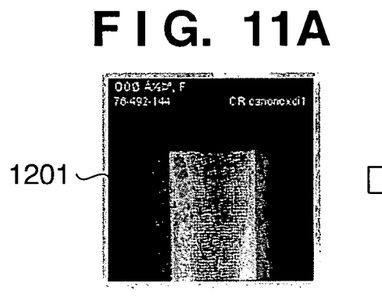
FIGS. 11A to 11D are diagrams illustrating knee joints.
Figure 11B:
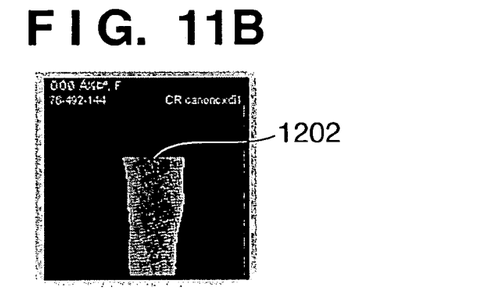

FIGS. 11A and 11B are X-ray images of a knee joint, in which reference numeral 1201 denotes the entire image and reference numeral 1202 indicates the state in which the knee joint, which is the subject region, and the area peripheral thereto have been extracted from the entire image. In a case where data that has been captured by some image sensing apparatus such as a sensor or camera as mentioned above is displayed on a monitor screen or X-ray diagnostic film, the general practice is to apply a gray level transformation to the captured data to thereby transform the captured data to density values that are easy to observe. For example, in a case where X-ray image data such as that of a knee joint is displayed on X-ray diagnostic film, a feature (e.g., an average density value) for the gray level transformation is extracted from the X-ray image data and a transformation is made in such a manner that the extracted feature attains a predetermined value (e.g., a predetermined density value).

One general method for performing the above-described gray level transformation will now be described with reference to FIGS. 11A and 11B. The image region (subject region) 1202 in which the object of interest is present is acquired by eliminating a direct irradiated region from the X-ray irradiated region in image 1201. A feature is calculated by performing a statistical investigation regarding the pixel values within the acquired subject region 1202. For example, a histogram of pixel values is created and the created histogram is analyzed to calculate the feature, or a statistical quantity such as an average pixel value within the acquired subject region 1202 is calculated. The gray level transformation is performed based upon the feature or statistical quantity.

Figure 11C:
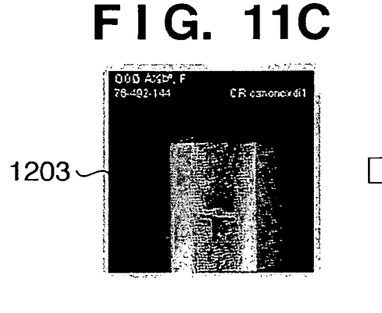
Figure 11D:
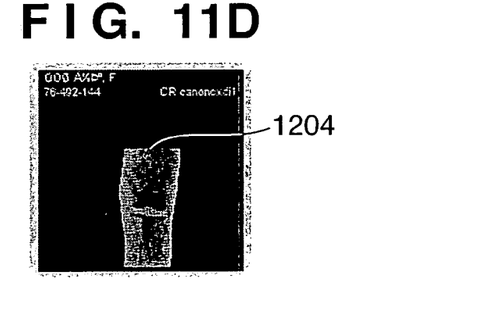

However, in a case where the pixel-value distribution within the subject region is not ordinary, e.g., in a case where a radiopaque object typified by a metal such as screw or artificial joint is present in the subject region, as illustrated in FIGS. 11C and 11D, the image of this radiopaque object has an influence upon the feature or statistical quantity with the method described above. As a result, a problem which arises is that the image after the gray level transformation is unstable. In order to perform the gray level transformation, therefore, a pure subject region from which the radiopaque object has been eliminated is acquired.

Figure 12A:
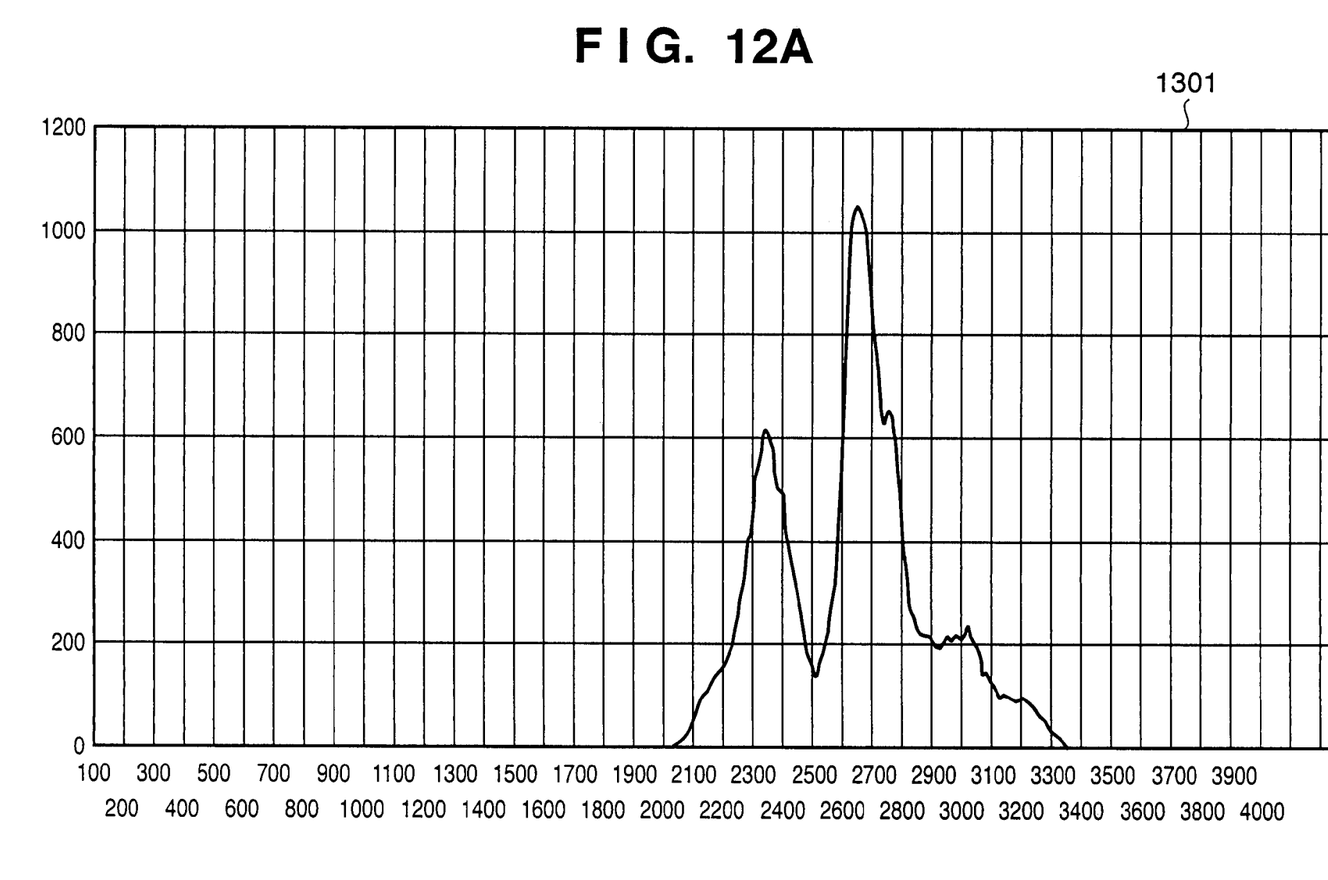
FIGS. 12A and 12B are diagrams for describing a method of histogram analysis of an approximate subject region of a knee-joint image.
Figure 12B:
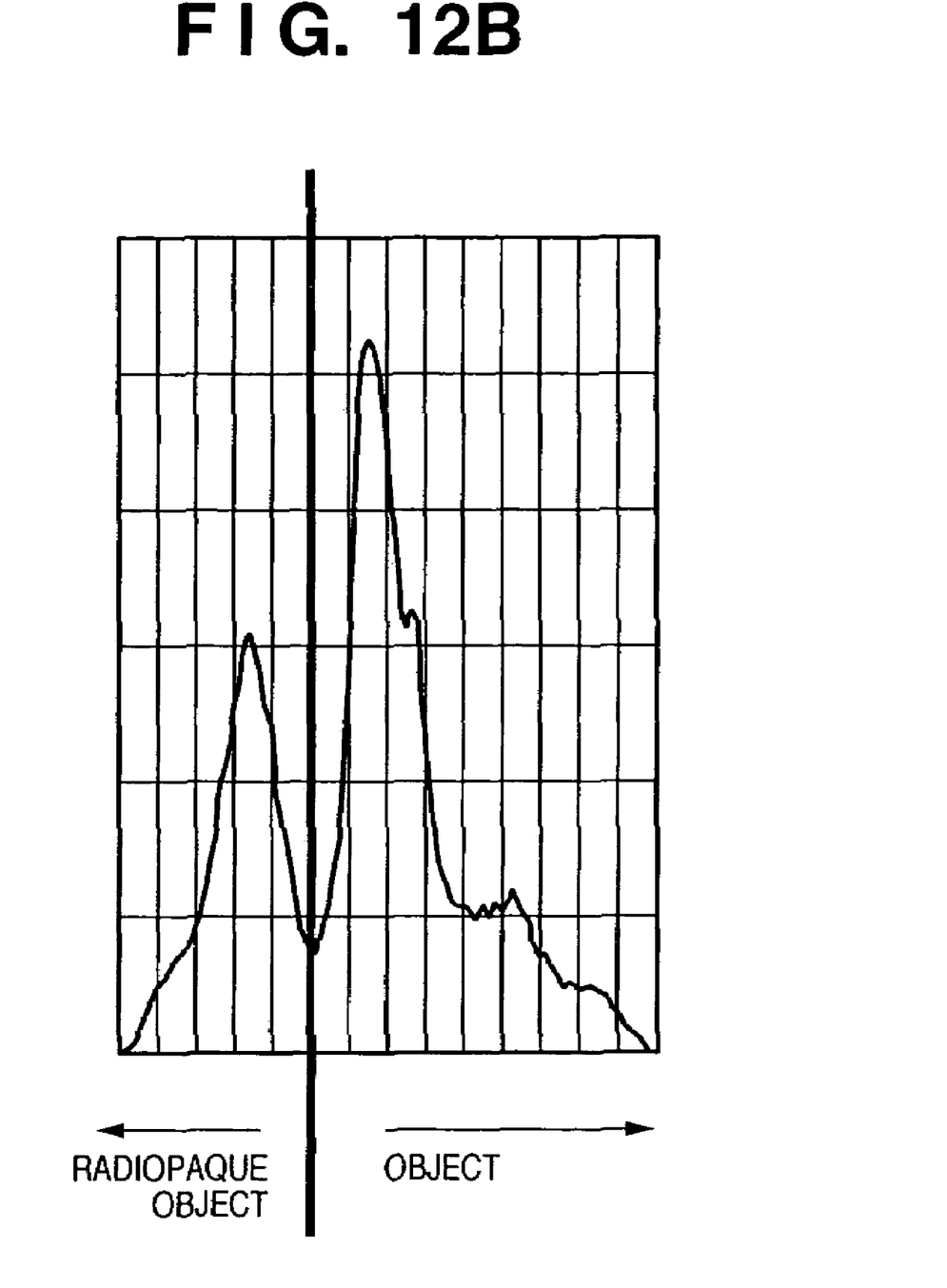

Known methods of acquiring a pure subject region include a method of executing binarization processing using a threshold value that has been set based upon experience, and a method of creating a histogram 1301 of a subject region 1204, as shown in FIG. 12A, detecting a pixel value of a valley portion between peaks by histogram analysis, and separating the image of the radiopaque object and the image of the subject using this pixel value as a boundary (FIG. 12B) (see "Image Processing Engineering—Introduction", edited by Yoshiharu Taniguchi, Kyoritsu Publishing K.K. (1996), Chapter 5 (pp. 79-97), Segmenting of Images).

However, with binarization processing that employs a threshold value based upon experience, there is the possibility that the threshold value will be inappropriate in the event that the photographic conditions of the X-ray examination change, and it may no longer be possible to separate the radiopaque object and the subject (object of interest) correctly. Further, with the method of performing histogram analysis shown in FIGS. 12A and 12B, a threshold value can be set appropriately to some degree. However, a problem which arises is that the radiopaque object and the subject cannot be separated in the case of a disease where the pixel values of the radiopaque object and subject approximate each other or change places.

SUMMARY OF THE INVENTION

Accordingly, an object of the present invention is to make it possible to acquire a pure subject region highly precisely and stably.

According to one aspect of the present invention, there is provided an image processing apparatus comprising: first acquisition means for acquiring a first region image by eliminating a non-X-ray irradiated region and a direct irradiated region from an X-ray image; decision means for deciding an initial region in the first region image by analyzing the first region image; region growing means for enlarging the initial region by using a region growing processing to obtain a second region in the first region image; and second acquisition means for obtaining a second region image which corresponds to the second region of the X-ray image.

According to another aspect of the present invention, there is provided an image processing method comprising: a first acquisition step of acquiring a first region image by eliminating a non-X-ray irradiated region and a direct irradiated region from an X-ray image; a decision step of deciding an initial region in the first region image by analyzing the first region image; a region growing step of enlarging the initial region by using a region growing processing to obtain a second region in the first region image; and a second acquisition step of obtaining a second region image which corresponds to the second region of the X-ray image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
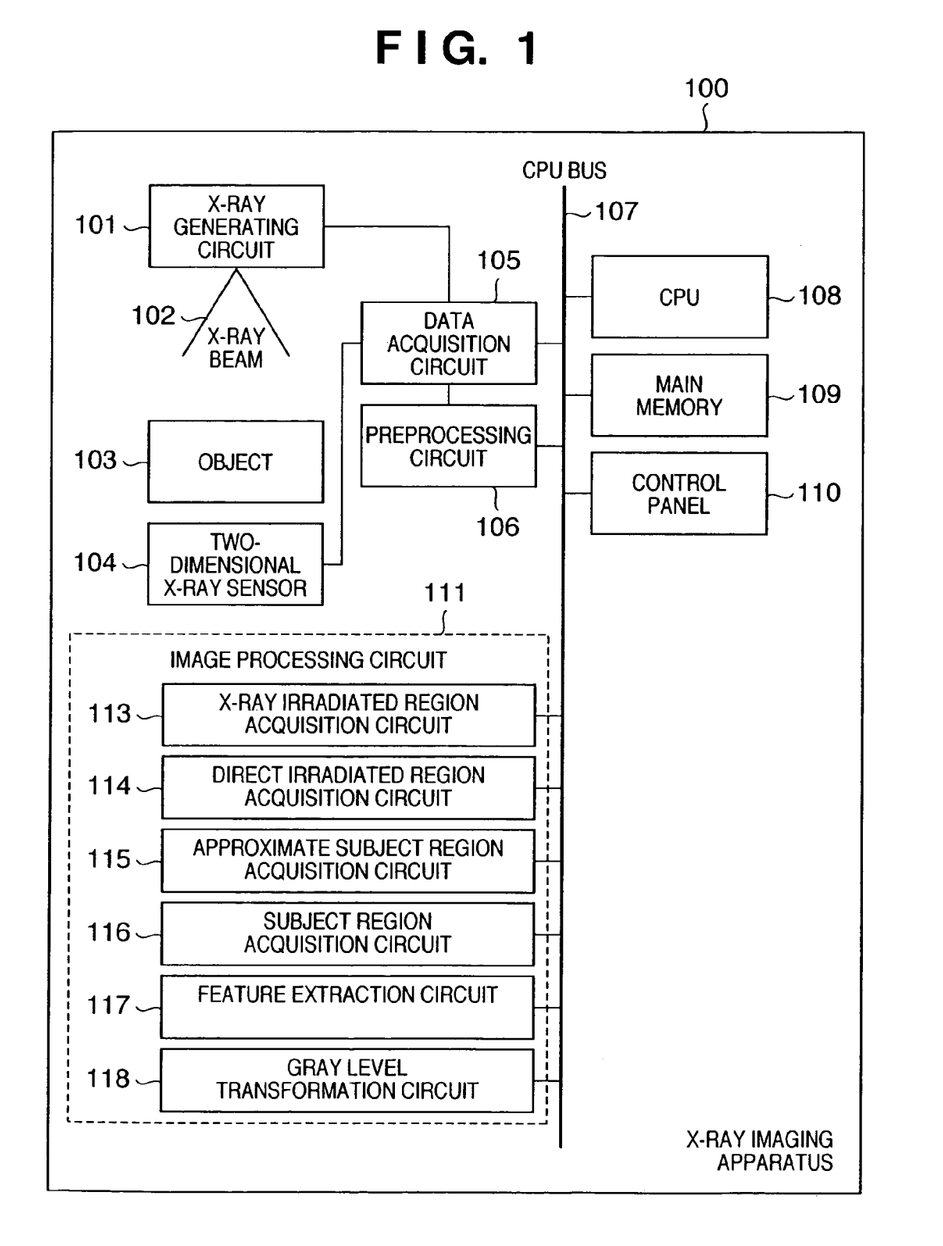
FIG. 1 is a block diagram illustrating the structure of an X-ray imaging apparatus according to a first embodiment of the present invention.

FIG. 1 is a block diagram illustrating the structure of an X-ray imaging apparatus 100 according to a first embodiment of the present invention. As shown in FIG. 1, the X-ray imaging apparatus 100 is one having an image processing function and includes a data acquisition circuit 105, a preprocessing circuit 106, a CPU 108, a main memory 109, a control panel 110 and an image processing circuit 111. The X-ray imaging apparatus 100 has a two-dimensional X-ray sensor 104 and an X-ray generating circuit 101 connected to the data acquisition circuit 105.

In the X-ray imaging apparatus 100 constructed as set forth above, the main memory 109 stores various data necessary for processing by the CPU 108 and includes a work memory for the CPU 108. The CPU 108 uses the main memory 109 to control various operations of the overall apparatus in accordance with operations performed at the control panel 110. The X-ray imaging apparatus 100 operates in the manner described below.

First, the X-ray generating circuit 101 emits an X-ray beam 102 toward an object 103. The X-ray beam 102 emitted from the X-ray generating circuit 101 passes through the object 103 while being attenuated, reaches the two-dimensional X-ray sensor 104 and is output as an X-ray image by the two-dimensional X-ray sensor 104. It is assumed here that the X-ray image that is output from the two-dimensional X-ray sensor 104 is an image of the portion of a human body, e.g., of a knee.

The data acquisition circuit 105 converts the X-ray image, which has been output from the two-dimensional X-ray sensor 104, to an electric signal and supplies the electric signal to the preprocessing circuit 106. The latter subjects the signal (X-ray image signal) from the data acquisition circuit 105 to preprocessing such as offset correction processing and gain correction processing. Under the control of the CPU 108, the X-ray image signal that has undergone this preprocessing by the preprocessing circuit 106 is transferred as an original image to the main memory 109 and image processing circuit 111 via a CPU bus 107.

The image processing circuit 111 includes an X-ray irradiated region acquisition circuit 113 for acquiring an X-ray irradiated region; a direct irradiated region acquisition circuit 114 for acquiring a direct irradiated region from the X-ray irradiated region; an approximate subject region acquisition circuit 115 for acquiring an approximate subject region from the X-ray irradiated region and direct irradiated region; a subject region acquisition circuit 116 for acquiring a subject region from the approximate subject region; a feature extraction circuit 117 for calculating a feature for a gray level transformation from the subject region; and a gray level transformation circuit 118 for performing a gray level transformation of an image based upon the feature calculated by the feature extraction circuit 117. The image processing circuit 111 may be implemented by hardware or a part or the entirety thereof may be implemented by software.

Figure 2:
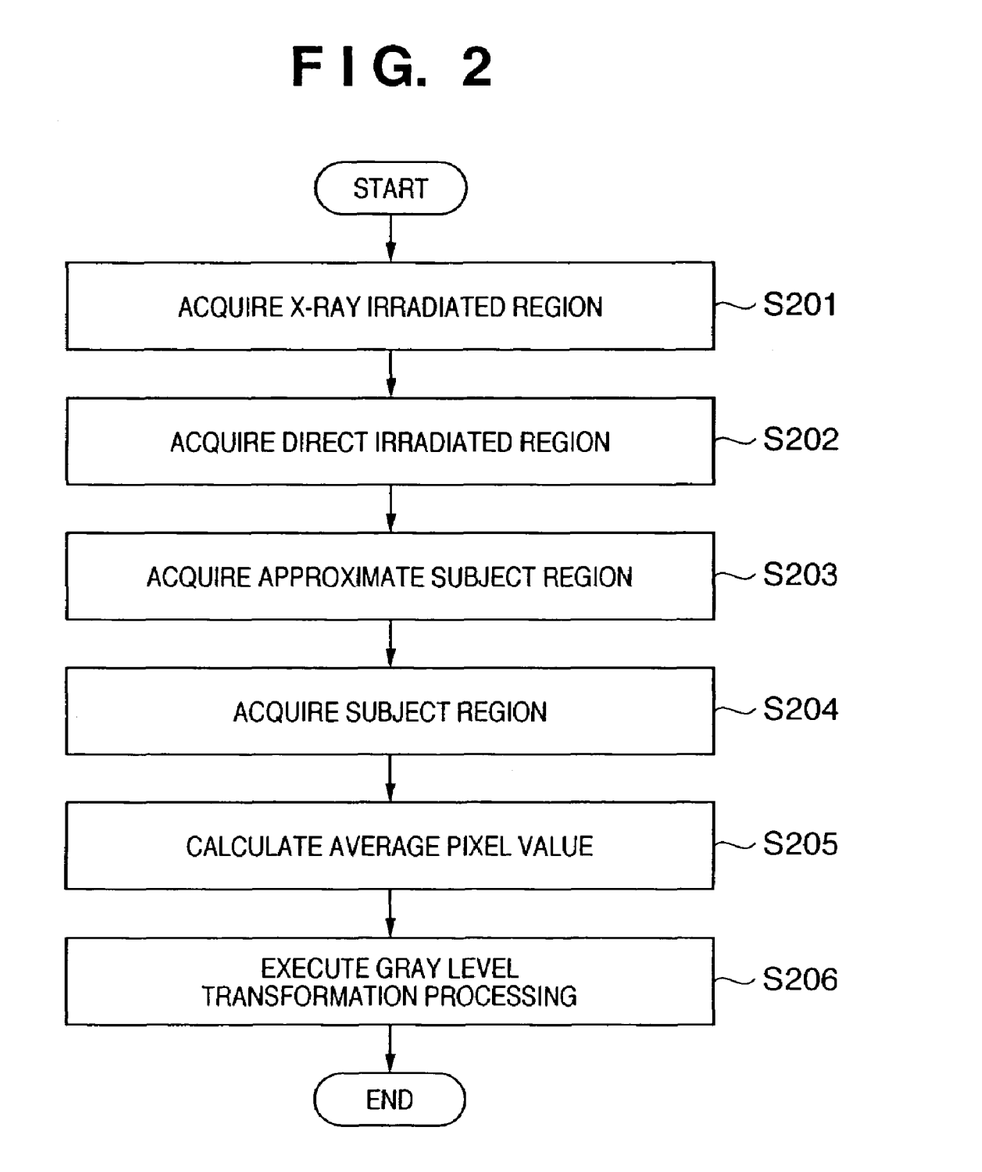
FIG. 2 is a flowchart for describing gray level transformation processing according to the first embodiment.
Figure 3:
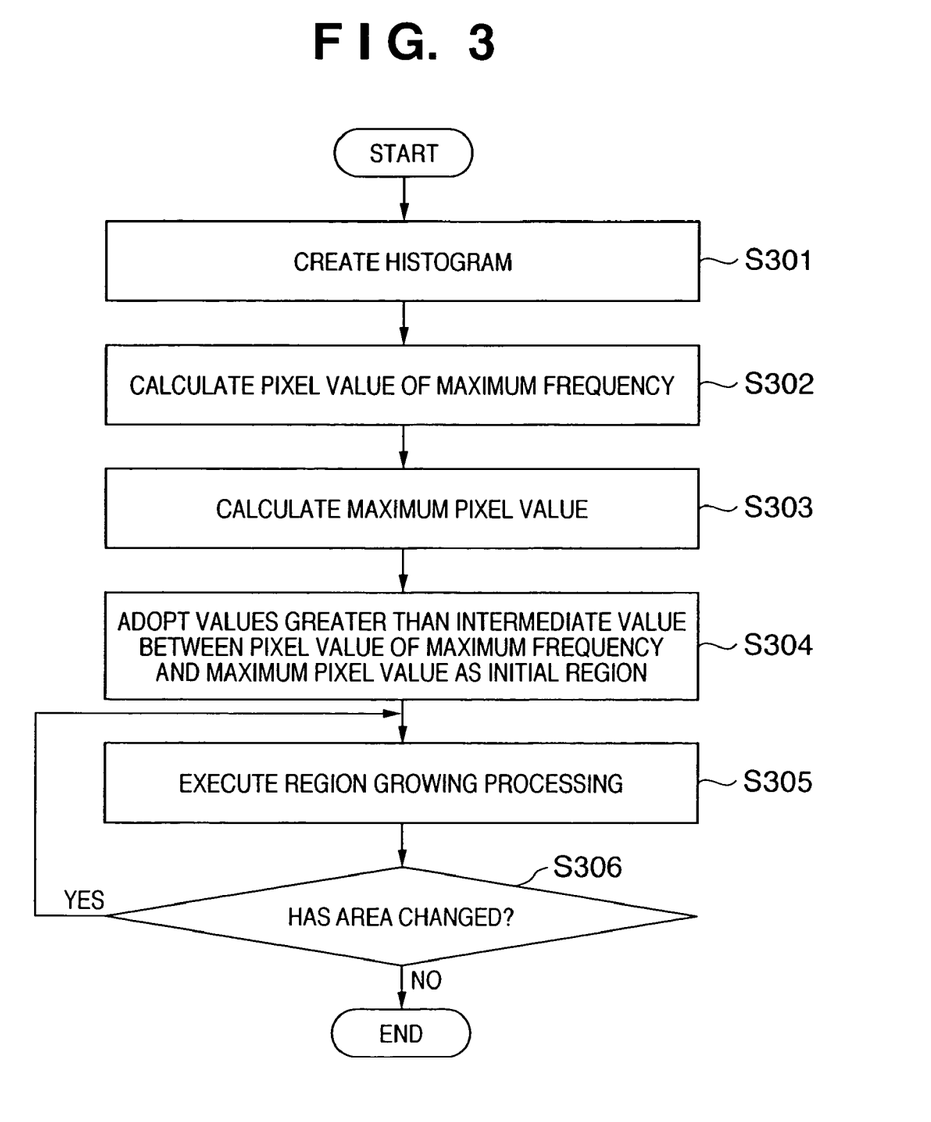
FIG. 3 is a flowchart for describing subject region acquisition processing according to the first embodiment.
Figure 4A:
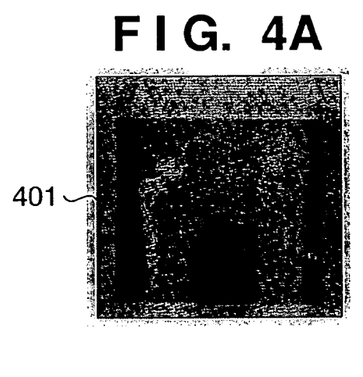
FIGS. 4A to 4E are diagrams illustrating hip-joint images.
Figure 4B:
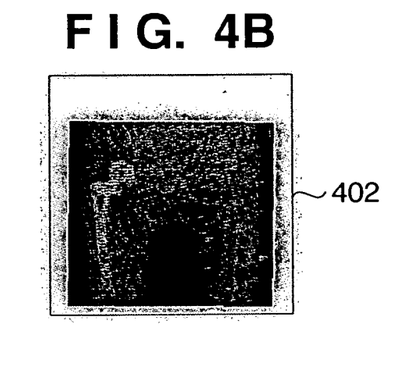
Figure 4C:
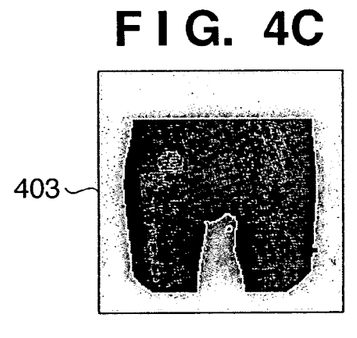
Figure 4D:
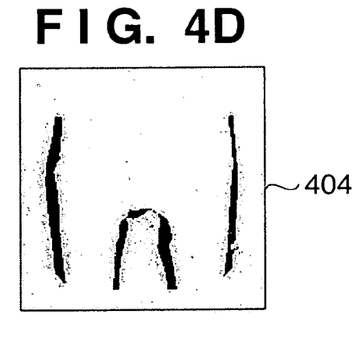
Figure 4E:
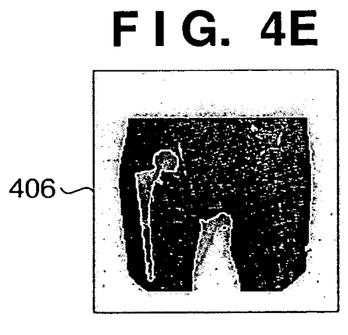
Figure 5:
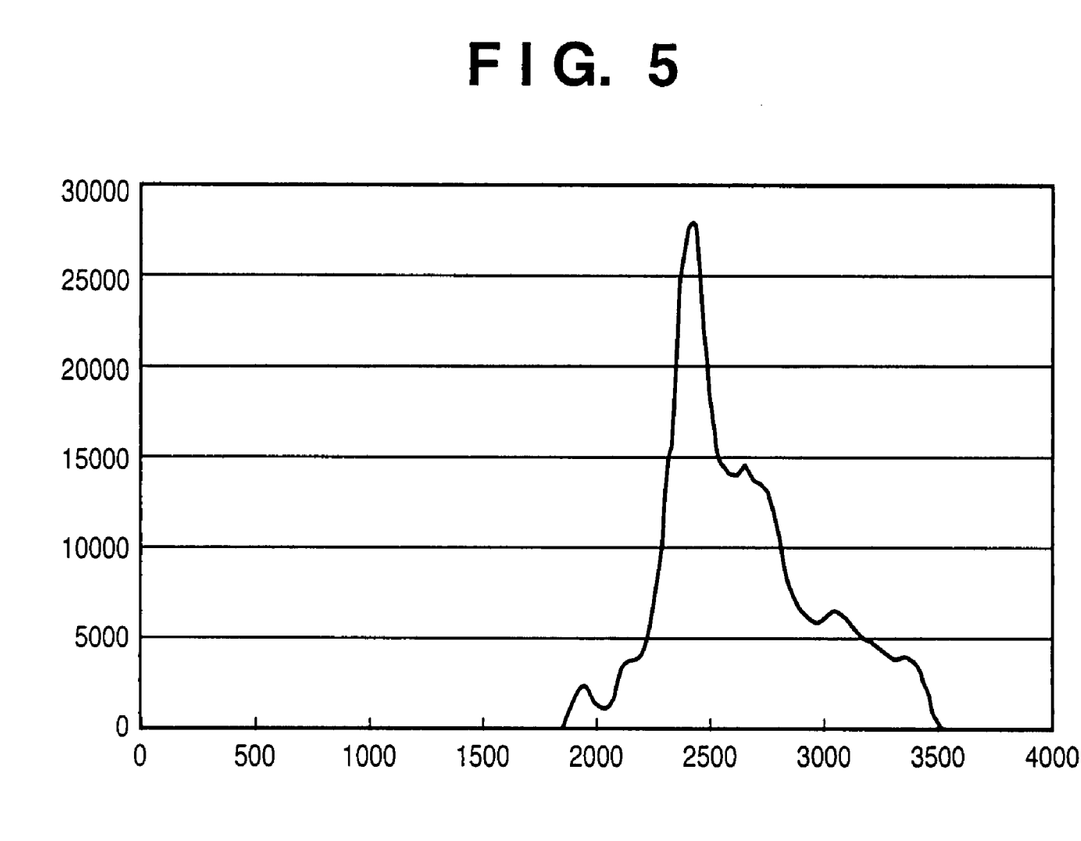
FIG. 5 is a diagram illustrating a histogram generated from the approximate subject region of a hip-joint image.

FIG. 2 is a flowchart for describing gray level transformation processing according to the first embodiment, and FIG. 3 is a flowchart for describing processing executed by the subject region acquisition circuit 116. Further, FIGS. 4A to 4E are examples of images that undergo subject region acquisition processing according to the first embodiment. Illustrated are an original image 401, an image (referred to as an "x-ray irradiated region image") 402 after acquisition of an X-ray irradiated region, an image (referred to as an "approximate subject region image") 403 after elimination of a direct irradiated region from the X-ray irradiated region, an image 404 indicating an initial region used in region growing, and an image (referred to an "a subject region image") 405 indicating a subject region that is the result of processing. Further, FIG. 5 is a histogram created from the image 403 indicating the approximate subject region image. Pixel values are plotted along the horizontal axis of the graph, and frequency along the vertical axis. Reference will be had to these diagrams to describe in detail the gray level transformation processing according to this embodiment.

First, under the control of the CPU 108, the original image (e.g., a hip-joint image) 401 that has been processed by the preprocessing circuit 106 is supplied to the image processing circuit 111 via the CPU bus 107. Upon receiving the original image 401, the image processing circuit 111 acquires the X-ray irradiated region of the original image 401 using the X-ray irradiated region acquisition circuit 113 and generates the X-ray irradiated region image 402 (step S201). Next, the image processing circuit 111 acquires the direct irradiated region of the X-ray irradiated region image 402 using the direct irradiated region acquisition circuit 114 (step S202) and deletes the acquired direct irradiated region from the X-ray irradiated region image 402 using the approximate subject region acquisition circuit 115, thereby generating the approximate subject region image 403 (step S203).

Next, the image processing circuit 111 generates the subject region image 405 from the approximate subject region image 403 (step S204). The processing of step S204 will now be described in detail with reference to FIGS. 3 to 5.

First, a histogram of the approximate subject region image 403 is created (step S301; FIG. 5). Next, a maximum-frequency pixel value Vf is extracted from the histogram created (step S302). Next, a maximum pixel value Vm of the approximate subject region image 403 is calculated (step S303) and then an initial region of the subject region is set (step S304). In this example, a set of pixels having-pixel values greater than an intermediate value (Vf+Vm)/2 between Vf and Vm is adopted as an initial region 404 (step S304). Next, the initial region 404 is subjected to region growing in accordance with prescribed conditions (step S305). In this example, region growing is defined in a case where pixel values Vi and Vo of neighboring pixels inside and outside an area satisfy the following equation:

$$Vi-Vo<Th$$

Figure 10A:
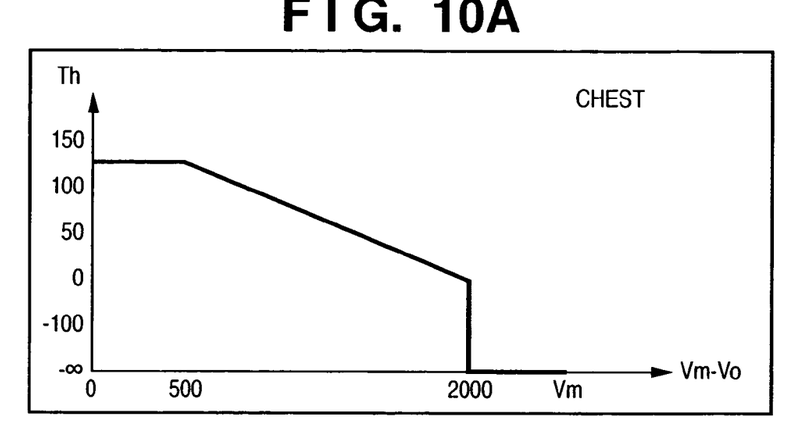
FIGS. 10A to 10C are diagrams for describing threshold values in region growing processing.
Figure 10B:
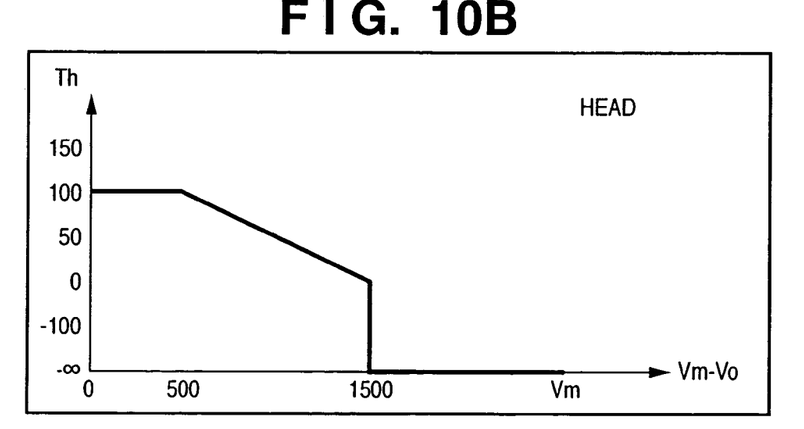
Figure 10C:
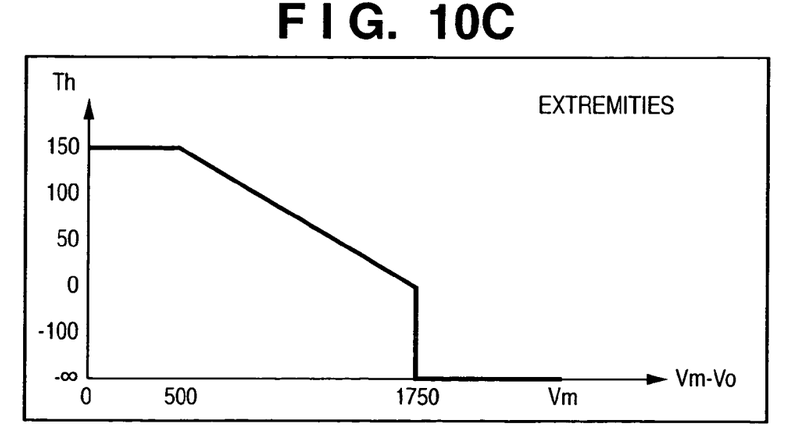

Here Th is a threshold value [Th=f(Vm,Vo)] decided by Vm and Vo. The threshold value is given as shown in FIG. 10C, by way of example. The difference between the pixel value inside the area and the neighboring pixel value outside the area is calculated. In the case of a 4-pixel neighborhood region growing algorithm, however, there are a maximum of four neighboring pixels outside the area (pixels above, below and to the left and right). Accordingly, the difference with respect to each of these is calculated and it is determined whether the pixel is inside or outside the area. Further, in the case of an 8-pixel neighborhood region growing algorithm, four diagonal directions are applied and a maximum of eight neighboring pixels will exist.

The above-described region growing processing is executed repeatedly as long as the region changes, and processing is terminated when the region no longer changes (step S306). The image portion of the original image 401 corresponding to the region thus obtained by region growing processing at the moment the processing of FIG. 3 is terminated is output as the subject region image 405. As illustrated in FIGS. 4A to 4E, the region of a radiopaque object 406 has been excluded from the subject region image 405, and it will be understood that the image of a pure subject region has been obtained.

With reference again to FIG. 2, feature extraction processing is executed using the subject region image 405 acquired at step S204 above, and a gray level transformation is performed based upon the feature extracted. First, the feature extraction circuit 117 calculates the feature from the subject region image 405 acquired by the subject region acquisition circuit 116 (step S205). An intermediate value or average value, etc., can be used as the feature. The gray level transformation circuit 118 then subjects the original image 401 to a gray level transformation based upon the feature calculated by the feature extraction circuit 117 (step S206). By way of example, the original image 401 is subjected to a gray level transformation in such a manner that the feature (intermediate value or average value) becomes a prescribed density.

Thus, in accordance with the first embodiment, a pure subject region is acquired by applying a region growing method to a region that has been extracted based upon an X-ray irradiated region and a direct irradiated region. More specifically, an effect of the first embodiment is that a pure subject region from which a radiopaque object typified by a screw, artificial joint or protector in the captured image has been removed can be obtained by an algorithm that is based upon the region growing method. Accordingly, even in cases where a radiopaque object exists in a captured image, a stable, highly precise gray level transformation can be performed without being affected by the radiopaque object.

Second Embodiment

Figure 6:
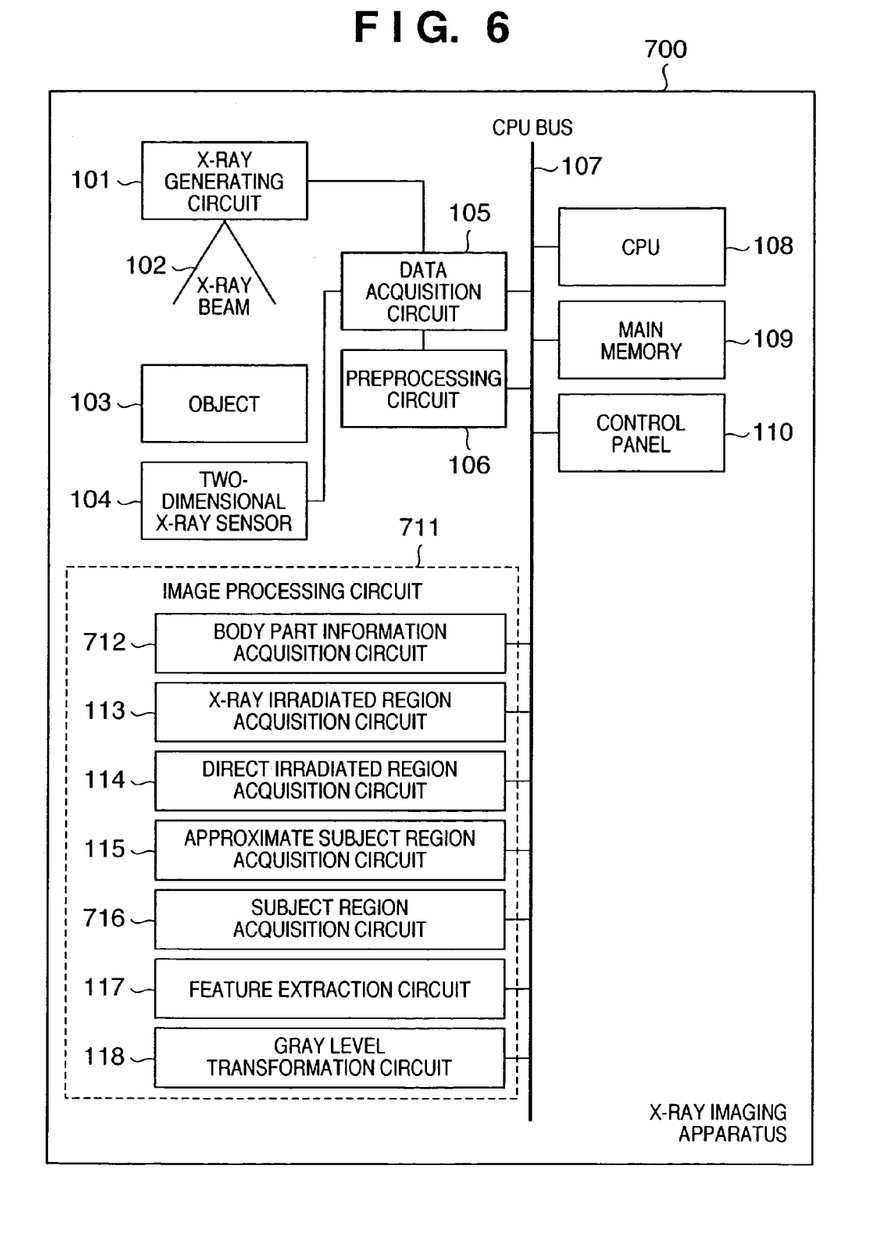
FIG. 6 is a block diagram illustrating the structure of an X-ray imaging apparatus according to a second embodiment of the present invention.

In a second embodiment, an arrangement in which the setting of an initial region or the condition of region growing is changed over for every body part photographed. FIG. 6 is a block diagram illustrating the structure of an X-ray imaging apparatus 700 according to the second embodiment. Components in FIG. 6 similar to those of the first embodiment (FIG. 1) are designated by like reference characters. The X-ray imaging apparatus 700 differs from the X-ray imaging apparatus 100 in that an image processing circuit 711 is further provided with a body part information acquisition circuit 712, and in that processing for creating an initial region and the initial value used in region growing are changed in the subject region acquisition circuit 716 depending upon the body part information that has been acquired by the body part information acquisition circuit 712. Accordingly, the content of processing in the subject region acquisition circuit 716 changed by the addition of the body part information acquisition circuit 712 will be described in detail.

Figure 7:
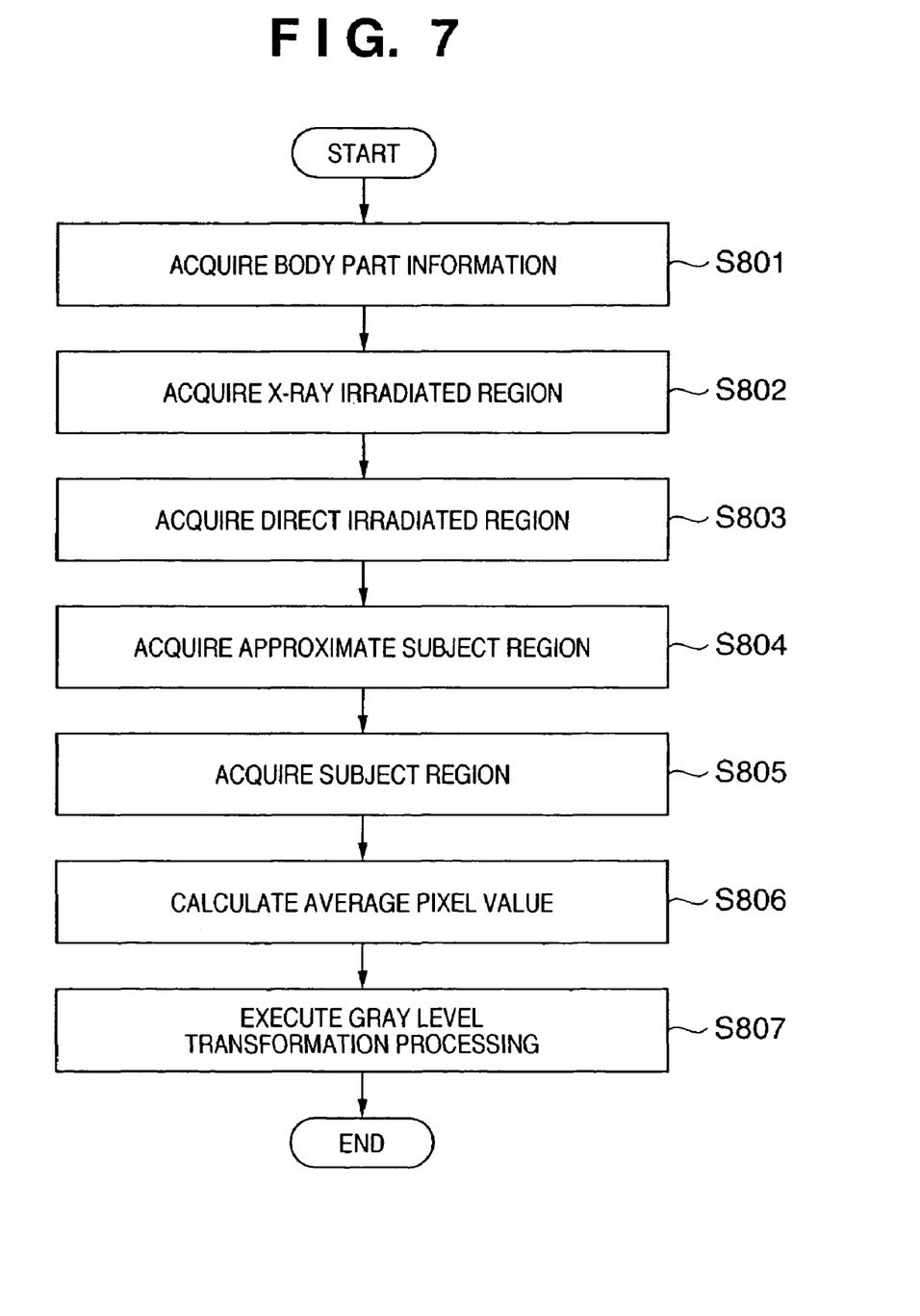
FIG. 7 is a flowchart for describing gray level transformation processing according to the second embodiment.
Figure 8:
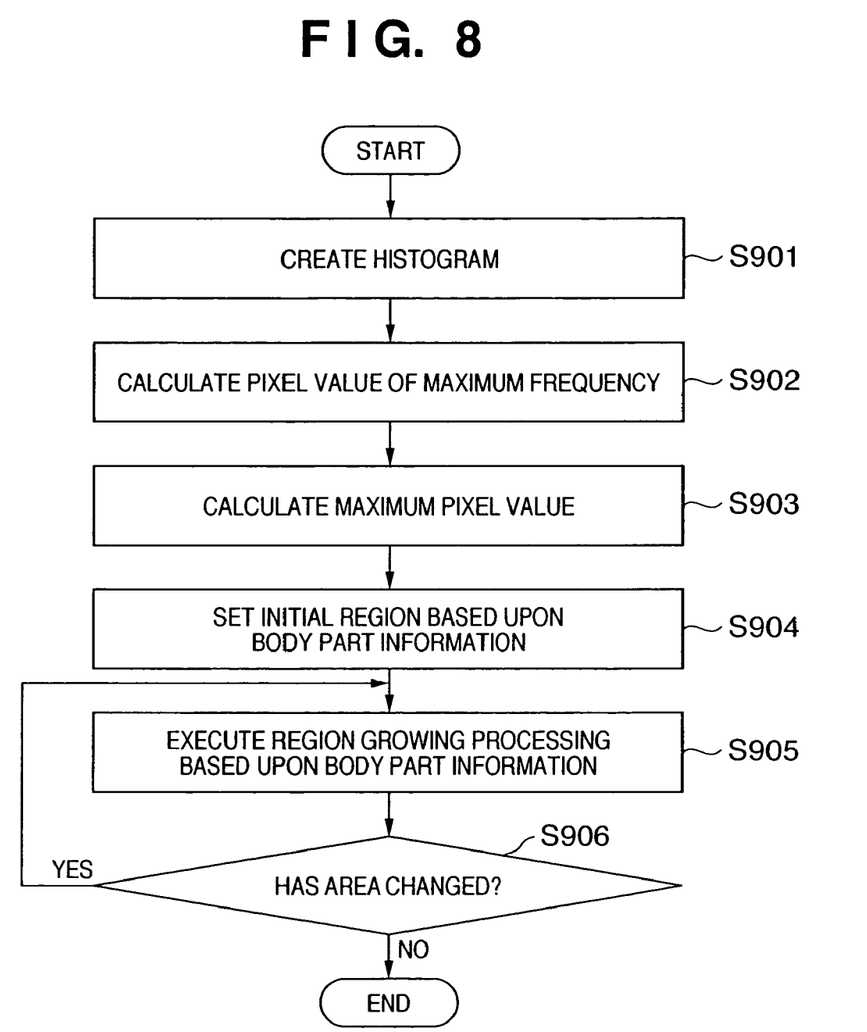
FIG. 8 is a flowchart for describing subject region acquisition processing according to the second embodiment.
Figure 9:
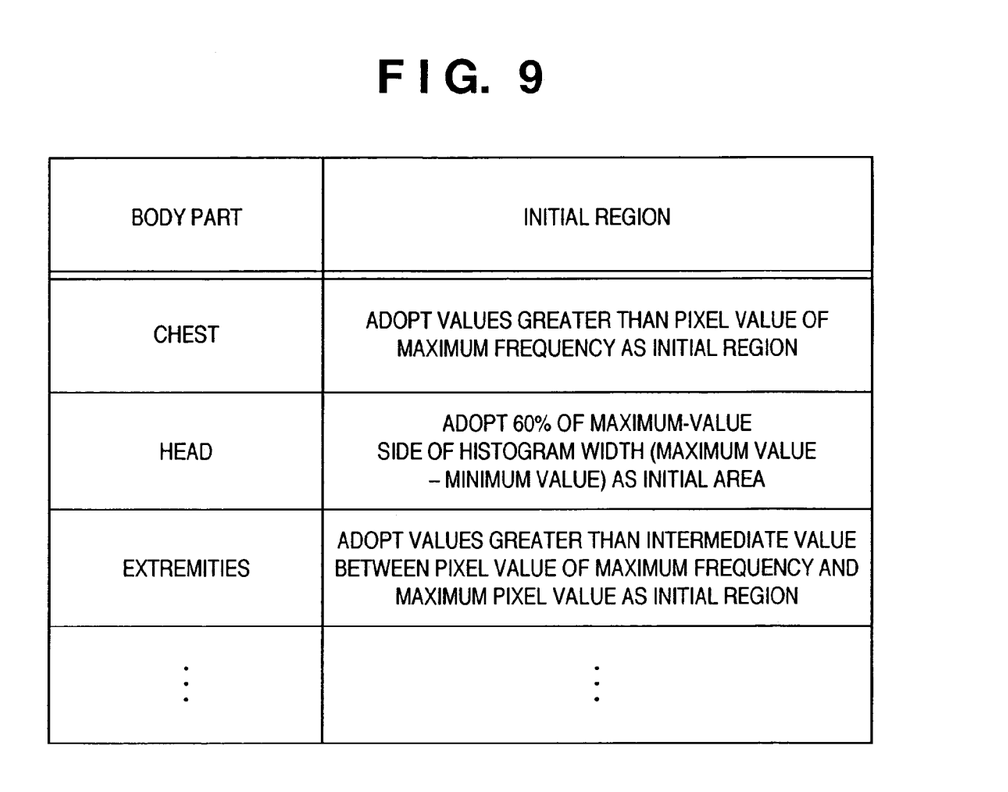
FIG. 9 is a diagram illustrating an initial-area forming rule, which has been set for every X-ray imaging region, used in region growing according to the second embodiment.

FIG. 7 is a flowchart illustrating a gray level transformation processing according to the second embodiment, and FIG. 8 is a flowchart for describing the processing of the subject region acquisition circuit 716 according to the second embodiment. The processing steps will be described using the examples of FIGS. 4A to 4E in a manner similar to that of the first embodiment. FIG. 9 illustrates a method of setting an initial region used in region growing, described below, and FIGS. 10A to 10C are graphs illustrating threshold values used in region growing. These graphs have been set in correspondence with respective ones of body part of interest.

First, under the control of the CPU 108, the original image (e.g., the hip-joint image) 401 that has been processed by the preprocessing circuit 106 is received by the image processing circuit 711. Upon receiving the original image 401, the image processing circuit 711 acquires the body part information of the original image 401 using the body part information acquisition circuit 712 and stores the information in the main memory 109 (step S801). Specific examples of processing executed by the body part information acquisition circuit 712 include a method of detecting a photographic body part from the original image 401 automatically by a technique such as pattern matching, and a method of allowing the operator to select or designate the region utilizing a control panel 710. It does not matter which method is used.

The approximate subject region image 403 is acquired by the X-ray irradiated region acquisition circuit 113, direct irradiated region acquisition circuit 114 and approximate subject region acquisition circuit 115 (steps S802 to S804). These processing steps are the same as steps S201 to S203 of the first embodiment (FIG. 2) and need not be described again.

Next, the subject region image 405 is generated from the approximate subject region image 403 by the subject region acquisition circuit 716 (step S805). The flow of this processing will be described in accordance with FIG. 8. It should be noted that steps S901 to S903 are similar to steps S301 to S303 in the first embodiment (FIG. 3).

The initial region of the subject region is set at step S904. A rule for forming an initial region set for every body part is selected using the body part information that the body part information acquisition circuit 712 stored in a main memory 709 at step S801, and the initial region 404 is set in accordance with the rule selected (step S904). FIG. 9 is a diagram showing an example of retention of rules for forming initial regions according to the second embodiment. As shown in FIG. 9, a range of pixel values to be selected as an initial region (a rule for forming an initial region) has been set for every body part (chest, head, extremities) to undergo X-ray imaging. Accordingly, if the body part to be photographed is "EXTREMITIES", for example, as exemplified in FIGS. 4A to 4E, then the rule selected is "ADOPT VALUES GREATER THAN INTERMEDIATE VALUE OF PIXEL VALUE HAVING HIGHEST FREQUENCY AND MAXIMUM PIXEL VALUE", and the initial region 404 is formed in accordance with this rule. It should be noted that the conditions of the initial regions shown in FIG. 9 illustrate examples of conditions that have been set in accordance with the features of the X-ray image of each body part and that these examples do not impose any limitation.

Next, the initial region 404 is subjected to region growing in accordance with certain conditions (step S905). In a manner similar to that of the first embodiment, region growing is defined in a case where pixel values Vi and Vo of neighboring pixels inside and outside the region satisfy the following equation:

$$Vi-Vo<Th\ (Vm, Vo, \text{body part information})$$

Here Th is a threshold value [Th=f(Vm,Vo, region)] decided by Vm, Vo and body part information. The threshold value is given as shown in FIGS. 10A to 10C, by way of example. Specifically, at step S905, the region-growth rule is changed or selected using the body part information that the body part information acquisition circuit 712 stored in the main memory 709 at step S801, and region growing is executed based upon the rule selected. It should be noted that the functions of the threshold values indicated in FIGS. 10A to 10c are such that the threshold value is low (region growth readily occurs) in a region of comparatively high pixel values where a radiopaque object tends not to be present and high (region growth does not readily occur) in a region of comparatively low pixel values where a radiopaque object tends to be present. Further, Th at minus infinity is the condition at which region growth will absolutely not occur. The reason while this condition differs depending upon the body part photographed is that it reflects the features of the body part statistically obtained. Further, by deciding the threshold value using the difference value with respect to the maximum pixel value, as mentioned above, the threshold value is set appropriately in regions where pixel values are comparatively high and regions where pixel values are comparatively low. It should be noted that the functions of the threshold values shown in FIGS. 10A to 10C illustrate examples of functions that have been set in accordance with the features of the X-ray images of each body part and that these examples are not limitative.

The above-described region growing processing is executed repeatedly as long as the region changes, and processing is terminated when the region no longer changes (step S906). The image portion of the original image 401 corresponding to the region thus obtained by region growing processing at the moment the processing of FIG. 8 is terminated is output as the subject region image 405. As illustrated in FIGS. 4A to 4E, the area of the radiopaque object 406 has been excluded from the subject region image 405, and it will be understood that the image of a pure subject region has been obtained.

In accordance with the second embodiment, as described above, besides the effect of the first embodiment, an additional effect is that an initial region or initial condition conforming to a photographic body part is set and an algorithm that is based upon a region growing method can be applied. Further, a radiopaque object typified by a screw, artificial joint or protector within the image thus captured can be eliminated in highly precise fashion and a pure subject region can be acquired stably. Accordingly, even in cases where a radiopaque object exists in a captured image, a stable, highly precise gray level transformation can be performed without being affected by the radiopaque object.

OTHER EMBODIMENTS

It goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Thus, in accordance with the embodiments described above, a pure subject region can be acquired from an approximate subject region acquired based upon an X-ray irradiated region and a direct irradiated region. In particular, an initial region is set based upon a pixel-value distribution of an approximate subject region and the set initial region is subjected to region growth based upon pixel values inside and outside the region. As a result, it is possible to acquire a more stable, highly precise subject region. In particular, in the discrimination of the inside and outside of a region based upon pixel values inside and outside the region, an initial region that has been set based upon a pixel-value distribution of an approximate subject region is subjected to region growth based upon pixel values inside and outside the region and the distribution of pixel values, thereby making it possible to acquire a more stable, highly precise subject region.

Further, in the setting of the initial region and in region growing, the content of this processing is changed in accordance with the photographic body part of the X-ray image, thereby making it possible to acquire a more stable, highly precise subject region.

In accordance with the present invention, a pure subject region can be acquired highly precisely and stably. Further, if it is so arranged that a gray level transformation is performed using the subject region thus obtained, it becomes possible to perform a gray level transformation that excludes effects ascribable to metal, etc., and excellent results of gray level transformation are obtained.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-077042 filed Mar. 17, 2004, which is hereby incorporated by reference herein.

What is claimed is:

1. An image processing apparatus comprising:
   first acquisition means for acquiring a first region image by eliminating a non-X-ray irradiated region and a direct irradiated region from an X-ray image;
   decision means for deciding an initial region in the first region image, the initial region having a pixel value more than a predetermined pixel value of a part of a subject except for a radiopaque object; and
   region growing means for enlarging the initial region by using a region growing processing to obtain a second region as the subject region in the first region image.

2. The apparatus according to claim 1, further comprising transformation means for calculating a feature from the second region image and executing a gray level transformation of the X-ray image or the first region image based upon the feature.

3. The apparatus according to claim 1, wherein said decision means sets a pixel value of highest frequency in the first region image as the predetermined pixel value.

4. The apparatus according to claim 1, wherein said decision means changes the predetermined pixel in accordance with a body part in the X-ray image.

5. The apparatus according to claim 1, wherein said region growing means discriminates whether a target pixel is to belong in a region by comparing a threshold value and the difference between a pixel value of the target pixel and a pixel value of a pixel within the region adjacent to the target pixel.

6. The apparatus according to claim 5, wherein in said region growing means, the threshold value is set based on the difference between the maximum pixel value and the pixel value of the target pixel in the first region image.

7. The apparatus according to claim 6, wherein said region growing means changes the function of the threshold value in accordance with the photographic body part in the X-ray image.

8. The apparatus according to claim 4, further comprising detecting means for detecting the photographic body part from the X-ray image.

9. An image processing method comprising:
   a first acquisition step of acquiring a first region image by eliminating a non-X-ray irradiated region and a direct irradiated region from an X-ray image;
   a decision step of deciding an initial region in the first region image, the initial region having a pixel value more than a predetermined pixel value of a part of a subject region except for a radiopaque object; and
   a region growing step of enlarging the initial region by using a region growing processing to obtain a second region in the first region image.

10. A computer readable storage medium storing a control program for causing a computer to execute the image processing method, the method comprising:
   a first acquisition step of acquiring a first region image by eliminating a non-X-ray irradiated region and a direct irradiated region from an X-ray image;
   a decision step of deciding an initial region in the first region image, the initial region having a pixel value more than a predetermined pixel value of a part of a subject region except for a radiopaque object; and
   a region growing step of enlarging the initial region by using a region growing processing to obtain a second region as the subject region in the first region image.

* * * * *

UNITED STATES PATENT AND TRADEMARK OFFICE
CERTIFICATE OF CORRECTION

PATENT NO.        : 7,418,122 B2
APPLICATION NO.   : 11/078369
DATED             : August 26, 2008
INVENTOR(S)       : Tomohiko Matsuura It is certified that error appears in the above-identified patent and that said Letters Patent is hereby corrected as shown below:

<u>COLUMN 4</u>:

Line 28, ""x-ray" should read --"X-ray--.
    Line 34, "an" should read --as--.
    Line 67, "having-pixel" should read --having pixel--.

<u>COLUMN 7</u>:

Line 32, "while" should read --why--.

Signed and Sealed this

Twenty-fourth Day of November, 2009

David J. Kappos
*Director of the United States Patent and Trademark Office*